United States Patent
Kaku et al.

(10) Patent No.: US 6,188,654 B1
(45) Date of Patent: Feb. 13, 2001

(54) METHOD AND APPARATUS FOR RECORDING/REPRODUCING BY PRE-PITS DETECTION

(75) Inventors: Toshimitsu Kaku, Sagamihara; Toru Kawashima, Fujisawa; Takehiko Sekine, Chigasaki; Hisataka Sugiyama, Kodaira; Yosiho Suzuki, Fujisawa; Tetsuya Fushimi, Chigasaki, all of (JP)

(73) Assignees: Htachi, Ltd., Tokyo; Hatachi Video & Information System, Inc., Yokohama, both of (JP)

( * ) Notice: Under 35 U.S.C. 154(b), the term of this patent shall be extended for 0 days.

(21) Appl. No.: 09/100,810

(22) Filed: Jun. 22, 1998

(30) Foreign Application Priority Data

Jun. 20, 1997 (JP) .................................................. 9-163738

(51) Int. Cl.[7] ...................................................... G11B 5/09
(52) U.S. Cl. ........................................ 369/47; 369/124.07
(58) Field of Search .............................. 369/47, 48, 50, 369/54, 58, 124.07, 124.15, 124.04, 275.3

(56) References Cited

U.S. PATENT DOCUMENTS 5,452,284 * 9/1995 Miyagawa et al. ........... 369/275.3 X

FOREIGN PATENT DOCUMENTS

| 1-194139 | 1/1992 | (JP) . |
| 6-176404 | 6/1994 | (JP) . |
| 7-141701 | 6/1995 | (JP) . |

* cited by examiner

Primary Examiner—Paul W. Huber
(74) Attorney, Agent, or Firm—Evenson, McKeown, Edwards & Lenahan, P.L.L.C.

(57) ABSTRACT

A beam is irradiated to an information recording medium having land tracks and groove tracks alternately formed on a track formed in turn on an information recording surface thereof and pre-pits so pre-formatted as to deviate from the center of the track, a return beam of the irradiated beam is received by detectors split into two parts in a track direction to obtain a differential signal, the pre-pit is detected from this differential signal and control of recording and reproducing processings is executed by using the pre-pit detection signal so obtained as the reference.

9 Claims, 8 Drawing Sheets

METHOD AND APPARATUS FOR RECORDING/REPRODUCING BY PRE-PITS DETECTION

BACKGROUND OF THE INVENTION

The present invention generally relates to information recording/reproducing technologies capable of optically recording and reproducing information to and from an information recording medium (optical disk) from which the information can be read optically. More specifically, this invention relates to a method suitable for an optical disk so formatted as to correspond to high density information recording, and to an information recording/reproducing apparatus achieving the functions of this method.

In optical disks in general, the information is reproduced by condensing a laser beam to an information recording surface of the optical disk and detecting those reflected beams which are modulated by recording marks and pits. The recording marks are formed along a guide groove on the spiral formed on the information recording surface. As described in JP-B-4-4661, the width of a groove and the width of a portion between the grooves are arranged to be substantially equal and the depth of the groove is set to the depth at which cross-talk from adjacent tracks determined by the wavelength of the laser beam to be irradiated becomes minimal. In consequence, the recording marks can be formed similarly on the guide grooves (groove tracks) and on the portions between the grooves (land tracks), reproduction of the information can be made, and the recording density in the radial direction of the disk can be improved.

When the groove is formed simply and continuously from the inner circumference to the outer circumference and when the reproducing operation shifts from the continuous reproduction on the groove track to the continuous reproduction of the land track, the time involved with this shift is necessary in order to continuously reproduce the information recorded on the groove track and on the land track on the optical disk, and continuous reproduction of the information on the land and groove tracks becomes impossible.

Therefore, as shown in JP-A-7-141701, if a groove (single spiral) is formed in such a fashion that the land track and the groove track appear alternately and substantially in each circumference, the information recorded on the land track and on the groove track can be reproduced continuously.

To reproduce the recording marks formed on the land track or the groove track, the condensing position of the laser beam on the information recording surface must be scanned along the substantial center of the land track or the groove track in the radial direction of the optical disk. The condensing position of the laser beam at this time can be identified from deviation (tracking deviation amount) which is substantially proportional to the distance from the substantial center position of the land track or the groove track by using diffraction components of the laser beam by the groove. The condensing position of the laser beam is controlled (tracking control) by using this deviation amount but the polarity of the deviation reverses between the land track and the groove track. In order to carry out continuous reproduction from the land track to the groove track or vice versa, therefore, the condensing position of the laser beam must be controlled in such a fashion as to correspond to the reversion of the polarity of the deviation amount at the alternating position of the land track and the groove track.

Therefore, regions are set in the radial direction substantially equidistantly in the circumferential direction on the track of the optical disk and pits are formed inside these regions, as described in JP-A-6-176404. In this instance, the pits are formed so that when the information of the pits is reproduced, the alternating position (polarity reversing position) between the land track and the groove track can be identified, and the tracking control state is changed over on the basis of this information.

The pits are formed in advance (or "pre-formatted") substantially equidistantly in the circumferential direction of the track. When these pre-pits are so formed as to alternately offset mutually at positions spaced apart by a quarter of the distance of the center position of each groove track adjacent to the land track in both inner and outer circumferential directions from the center position of the land track or the groove track, the signal that reproduces the bit information on the deviation signal representing the tracking deviation amount can be outputted.

In other words, it is possible to identify the formation position of the pre-pit (PID: Physical Identification portion) by detecting the position where the tracking deviation amount alternates to the positive and the negative in the cycle of the pit information and also to judge which of the land track and the groove track the optical spot scans at present from the positive and negative sequence of the signal output corresponding to the pits.

FIG. 2 is a schematic block diagram of an optical disk apparatus including a PID position detector. An optical disk medium 1 is rotated by a spindle motor 2 substantially at a constant linear velocity. An optical head 3 includes optical components for condensing for a laser beam on an information recording surface of the optical disk, a detector for detecting a reflected beam, a PD track head for making the condensing position variable, and so forth.

Automatic gain controllers 1 (AGCS) 11 and 12 control an RF (Radio Frequency) signal as the level change of the reflected beam from the optical head and an HPP (High-Frequency Push-Pull) signal corresponding to the tracking deviation amount to constant amplitude levels. The amplitude of the HPP signal changes with variance of the groove depth of the optical disk, with variance of the reflection factor of the optical disk, with variance of the laser beam quantity irradiated to the optical disk and with sensitivity variance of a detector which receives the reflected beam from the optical disk and converts it to an electric signal. Further, the waveform amplitudes vary between the land track and the groove track when the laser beam is so condensed at the PID portion as to deviate from the center position of the track or when the laser beam turns to an elliptic spot at the condensing position while deviating from the vertical axis of the optical disk.

For this reason, PID position detection cannot be carried out stably at the slice level of the comparator described above as a fixed level against the variation of the HPP signal amplitude, and PID detection is effected after the amplitude is controlled to a predetermined amplitude by the automatic gain controllers (AGCs). Because the signal amplitude of the RF signal changes with the recording condition, the amplitude is rendered constant by the AGC so that digitization can be carried out stably.

A switch 13 switches the PID portion and the data track on the optical disk by a signal switch signal 32 from the PID position detector, selects at the PID portion the output of the AGC 13 that has processed the HPP signal and selects on the data track the output of the AGC 12 that has processed the RF signal. The output of this switch 13 is inputted to a DC corrector 14 to render a DC level of each signal substantially constant. For example, envelopes at the upper and lower portions of each signal are detected in a reference signal region at the leading part of each signal and control is made so that the mean level of the upper and lower envelopes attains an arbitrary level.

The output of the DC corrector 14 is inputted to an automatic slice level controller (ASC) 15 and is digitized at a suitable slice level. The output of this ASC 15 is inputted to a phase-locked loop (PLL) 16 and a reproduction clock synchronized with the digitized signal is generated. The reproduction clock is inputted with the digitized signal to a reproduction signal demodulator 17 so that recording information is demodulated from the RF signal of the data track while the position information of the optical disk is demodulated from the HPP signal of the PID portion. When this HPP signal is demodulated, the information about alternation of the land track and the groove track can be obtained, too.

The pit information of the PID position contains the information about the position on the optical disk and the information as the reference for the reproduction processing, and the position information is formed in succession to the reference information. Generally, the signal frequency of the reference information is constant and the reproduction processing system executes control by using this reference information, so that the position information can be stably reproduced. Incidentally, the RF signal, too, contains the reference information at the leading part thereof in the same way as the PID portion, and the recording information is formed in succession to this reference information.

SUMMARY OF THE INVENTION

The PID position detector for distinguishing the PID portion from the recording region acquires the envelope waveforms of the HPP signal waveform by using a peak detector and a bottom detector from the output waveform (HPP signal) corresponding to the tracking deviation amount and the comparator compares the peak slice level with the bottom slice level to detect the PID portion. The PID portion can be detected also by suppressing the high frequency components of the HPP signal corresponding to the pit information by a high-pass filter as the waveforms inputted to the comparator.

No problems develop, in particular, as long as the PID position controller executes the control so that the laser beam is appropriately condensed to the center position of the track (tracking control), but when the tracking control is not effected at the time of seek from the track which is reproduced at present to another or when the tracking control gets unstable due to noises, for example, the tracking deviation amount fluctuates and the HPP signal cannot be distinguished from the signal fluctuation by the pit at the PID portion and consequently, the PID portion is erroneously detected from time to time.

It is therefore an object of the present invention to provide a method of controlling a signal processing system which can detect the PID portion in a satisfactory manner by a simple processing system when the tracking control is not made or when it gets unstable, and an information recording/reproducing apparatus using such a method.

To accomplish the object described above, a method of controlling a signal processing system according to this invention comprises the steps of irradiating a laser beam to an information recording medium having a construction in which land tracks and groove tracks are alternately formed on tracks formed on an information recording surface, and pre-pits to be pre-formatted are so formed as to deviate from the track center, receiving the return beam of the irradiated beam by detectors split into two parts in the track direction to obtain differential signals, detecting the pre-pit portions from the differential signals so obtained, and controlling recording and reproducing processings on the basis of the detected pre-pit detection signal as the reference.

BRIEF DESCRIPTION OF THE DRAWINGS

FIG. 16 is a timing chart of another example the driving controller according to the present invention.

DESCRIPTION OF THE PREFERRED EMBODIMENTS

Figure 1:
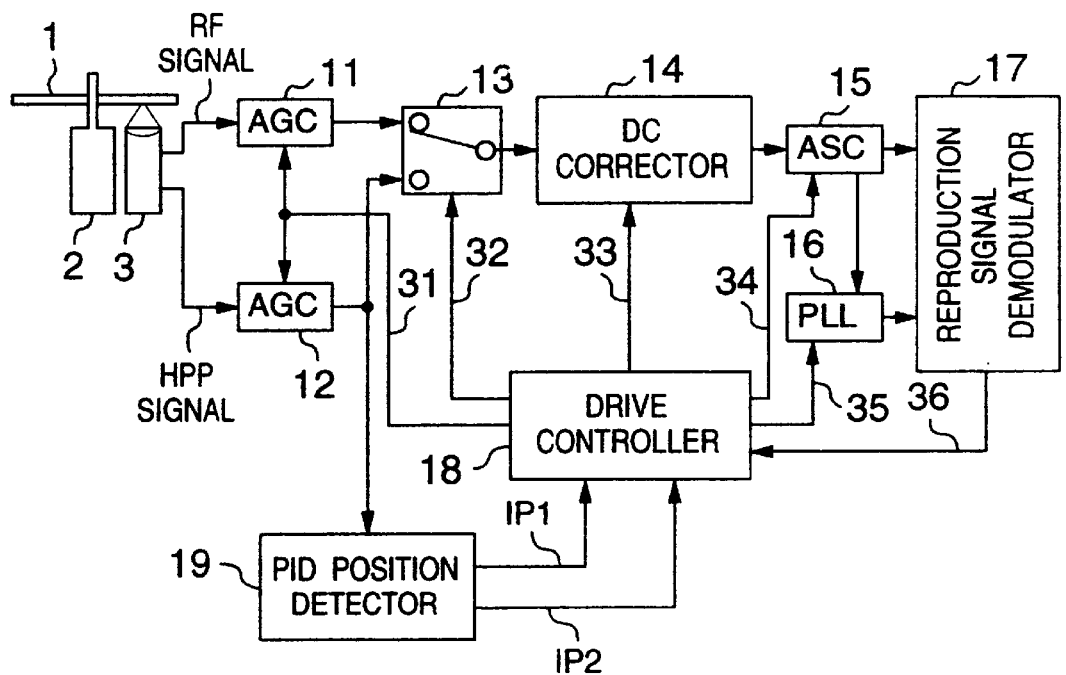
FIG. 1 is a block diagram of a reproduction processing system of an information recording/reproducing apparatus according to the present invention.
Figure 2:
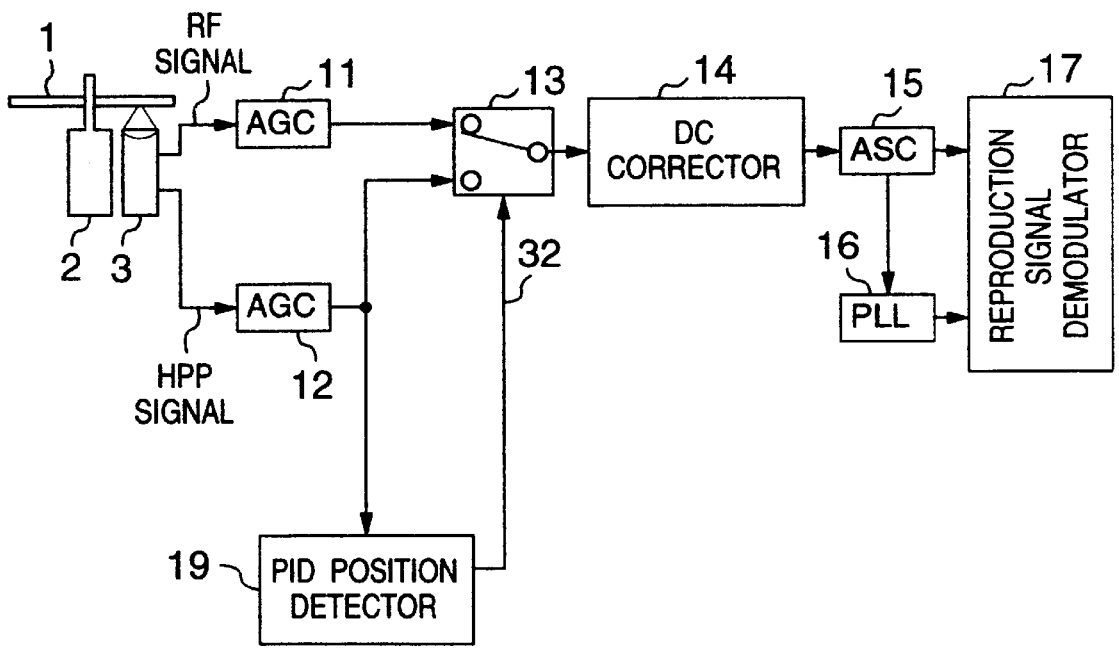
FIG. 2 is a block diagram of a reproduction processing system of an information recording/reproducing apparatus according to the prior art.

FIG. 1 is a schematic block diagram of an embodiment of the present invention, wherein the explanation of the same portion as the one shown in FIG. 2 is omitted. The aforementioned RF signal from the optical head and the HPP signal are controlled to the predetermined amplitude levels by the automatic gain controllers (AGCs) 11 and 12 described already, respectively. The drive controller 18 improves response of control at the leading part of each signal by the AGC signal 31 in such a manner as to rapidly attain a predetermined amplitude and to thereafter lower the response so as not to follow a quick amplitude change but to execute stable control.

The switch 13 described already changes over the PID track and the data track on the optical disk by the signal switch signal 32 from the drive controller 18, selects on the PID track the output of the AGC 12 obtained by processing the HPP signal and selects on the data track the output of the AGC 11 obtained by processing the RF signal.

The output of the switch 13 is inputted to the DC corrector 14 described above, which makes the substantial DC level of each signal constant. This operation is executed under the control of the DC correction control signal 33 from the drive controller 18 which turns on or off the DC correction operation.

The output of the DC corrector 14 is inputted to the afore-mentioned automatic slice level controller (ASC) 15 and is digitized at a suitable slice level. This ASC 15 is executed under control of the ASC control signal 34 from the drive controller 18 which turns on or off the ASC operation.

The output of the ASC 15 is inputted to the PLL 16 and a reproduction clock synchronized with the digitized signal is generated. This reproduction clock is inputted with the digitized signal to the reproduction signal modulator 17 so that the recording information is demodulated from the RF signal of the data track while the position information of the optical disk is demodulated from the HPP signal of the PID track. When this HPP signal is demodulated, the information about alternation of the land track and the groove track can be acquired, too.

The PLL 16 is so controlled by the PLL control signal 35 from the drive controller 18 as to switch the signal to be synchronized to the reproduction signal or to the reference signal. The drive controller 18 obtains the PID information signal 36 from the reproduction demodulator 17.

When the PID information signal 36 from the reproduction demodulator 17 is detected, the drive controller 18 generates various drive control signals 31, 32, 33, 34 and 35 with the PID information as the reference. When the area on the optical disk at which a desired information is recorded is sought or when the PID information cannot be obtained stably and continuously at the start of the operation of the optical disk apparatus, the drive controller 18 generates various drive control signals 31, 32, 33, 34 and 35 on the basis of the PID detection signals IP1 and IP2 from the PID position detector 19. These IP1 and IP2 are the detection signals that correspond to the land track and the groove track, respectively.

Incidentally, when the PID information signal 36 is detected, too, various control signals 31, 32, 33, 34 and 35 may be generated on the basis of the PID detection signals IP1 and IP2 of the present invention.

These various drive control signals 31, 32, 33, 34 and 35 make it possible to stably reproduce the information of the HPP signal and the RF signal by controlling each signal processing system for a predetermined period from the information (VFO) area as the reference of the leading part of each of the HPP signal and the RF signal.

Figure 3:
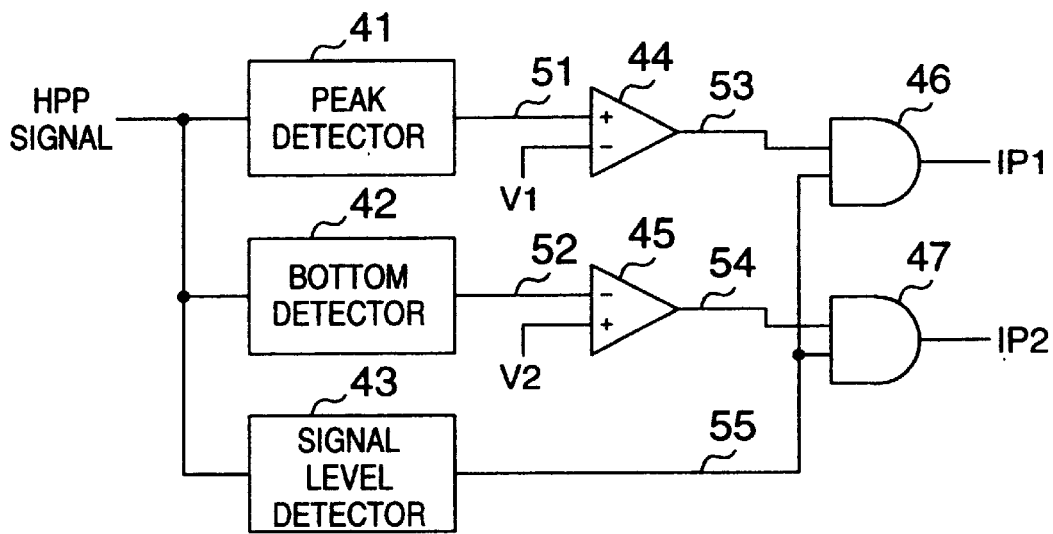
FIG. 3 is a block diagram of an example of a PID position detector according to the present invention.
Figure 4:
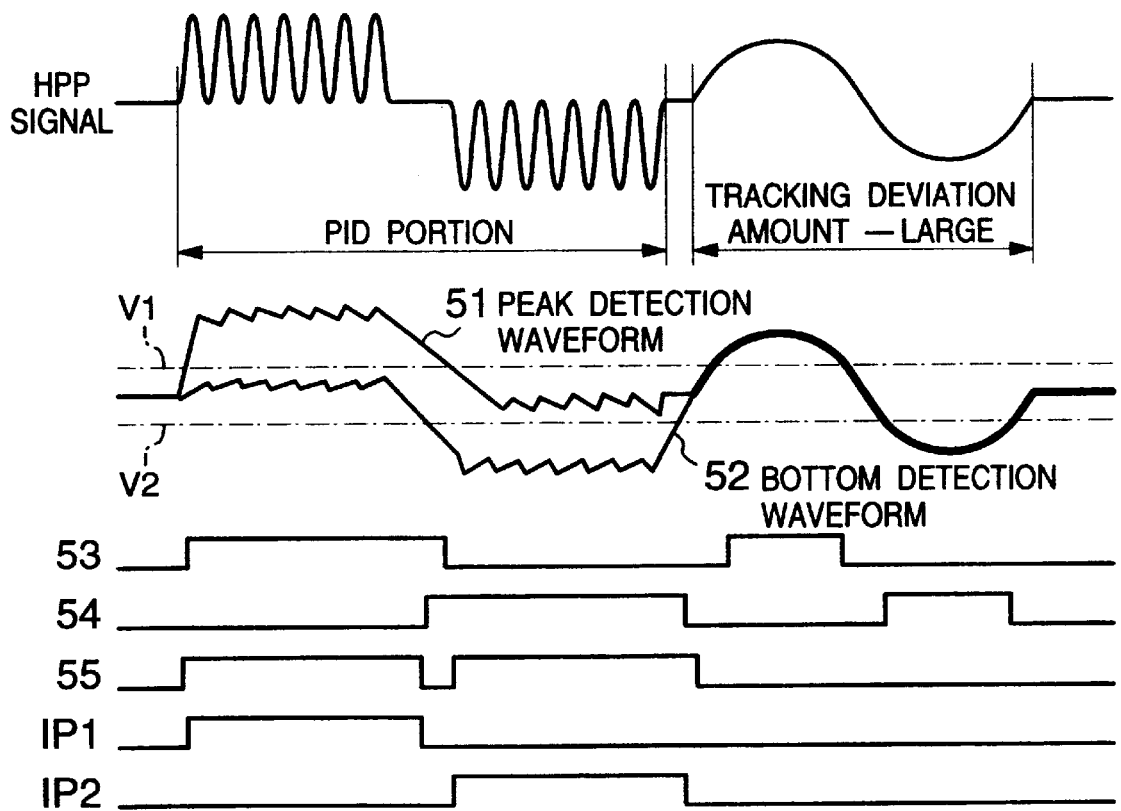
FIG. 4 is a signal waveform diagram of each portion of the example of the PID position detector according to the present invention shown in FIG. 3.

FIG. 3 shows an example of the PID position detector 19 according to the present invention. FIG. 4 shows the signal waveform at each portion in this example. Positive and negative pit information appear in the HPP signal. The waveform also changes to positive and negative at the portion where a tracking deviation amount is great. The HPP signal is inputted to the peak detector 41 and to the bottom detector 42 to obtain a peak detection waveform 51 and a bottom detection waveform 52, respectively. These waveforms are compared with the slice levels V1 and V2 by comparators 44 and 45, respectively, to obtain a positive portion detection signal 53 and a negative portion detection signal 54. In this case, the positive portion detection signal 53 and the negative portion detection signal 54 occur at the PID portion to attain "1". At the portion having the large deviation amount, too, these positive portion detection signal 53 and negative portion detection signal 54 occur to attain "1".

Therefore, a signal detection signal 55 representative of the existence of the RF (Radio Frequency) component such as the pit information is obtained by the signal level detector 43. The signal detection signal 55 attains "1" at portions at which the signal having the RF component exists, such as at the pit portion, and attains "0" at portions where the signal having the RF signal does not exist. For this reason, the signal detection signal 55 turns to "0" at the portions where the tracking deviation amount is great. Assuming that the logical ORs carried out between this signal detection signal 55 and the positive portion detection signal 53 and between the signal detection signal 55 and the negative portion detection signal 54 are IP1 and IP2, IP1 and IP2 become the signals having "1" at only the pit portions of the PID portion. The signal level detector 43 detects the existence/absence of the signal component from the change of the envelope waveform by extracting the RF component, for example.

Figure 5:
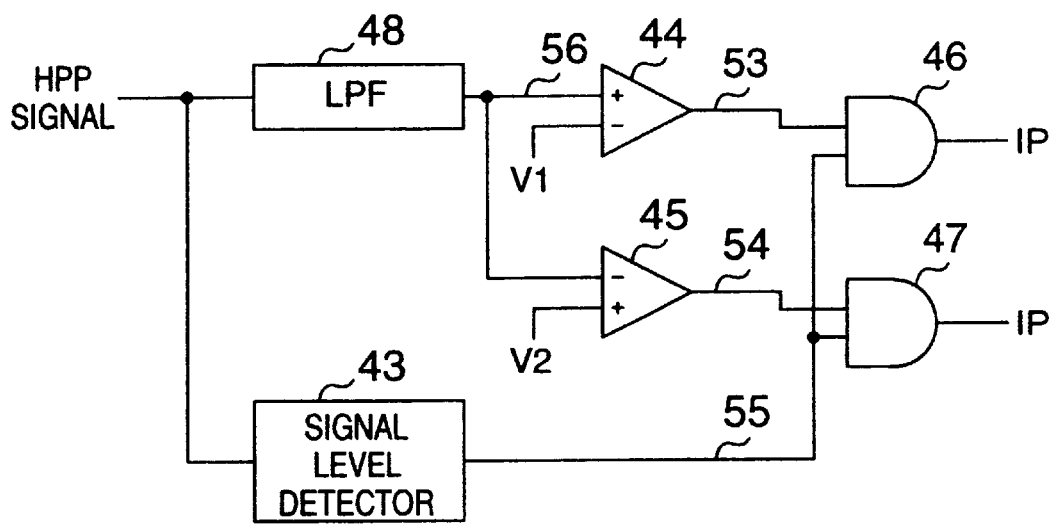
FIG. 5 is a block diagram of another example of the PID position detector according to the present invention.
Figure 6:
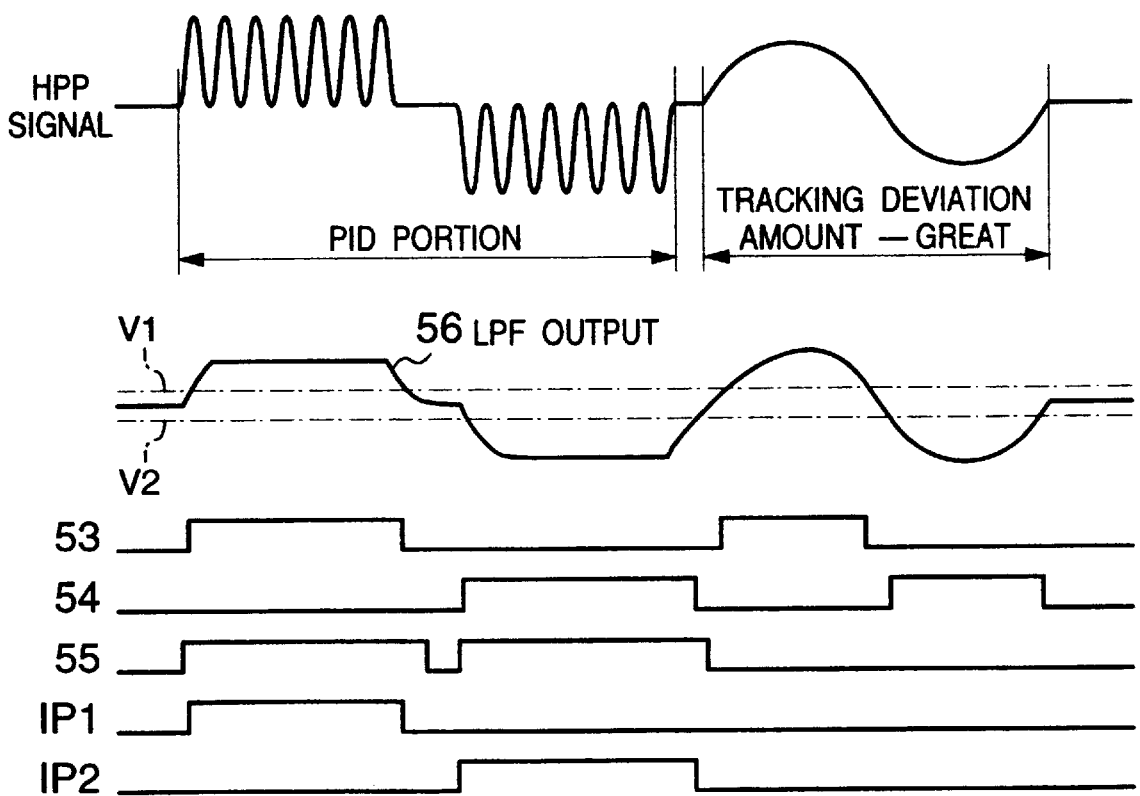
FIG. 6 is a signal waveform diagram at each portion of the example of the PID position detector according to the present invention shown in FIG. 5.

FIG. 5 shows another example of the PID position detector 19 according to the present invention, and FIG. 6 shows the signal waveform at each part in this example. The HPP signal is inputted to a low-pass filter (LPF) 48 to obtain a signal component 56 as a low frequency component signal of the HPP signal, and is compared with a slice level V3, V4 by each comparator 44, 45 to obtain each of the positive portion detection signal 53 and the negative portion detection signal 54. In this case, the positive portion detection signal 53 and the negative portion detection signal 54 occur at the IPD portion and attain "1" and at the portion where the tracking deviation amount is great, too, these positive portion detection signal 53 and negative portion detection signal 54 occur and attain "1". Therefore, assuming that the logical ORs carried out between the signal detection signal 55 that attains "1" at the pit portions and the positive portion detection signal 53 and between the signal detection signal 55 and the negative portion detection portion 54 by the signal level detector 43 are IP1 and IP2, these IP1 and IP2 become the signals which are "1" at only the pit portions of the PID portion.

Figure 7:
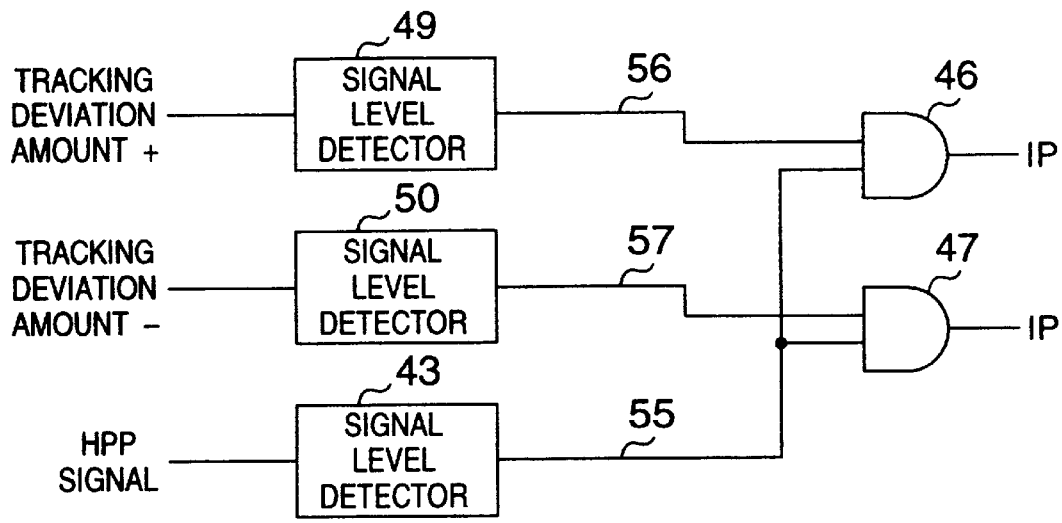
FIG. 7 is a block diagram of still another example of the PID position detector according to the present invention.
Figure 8:
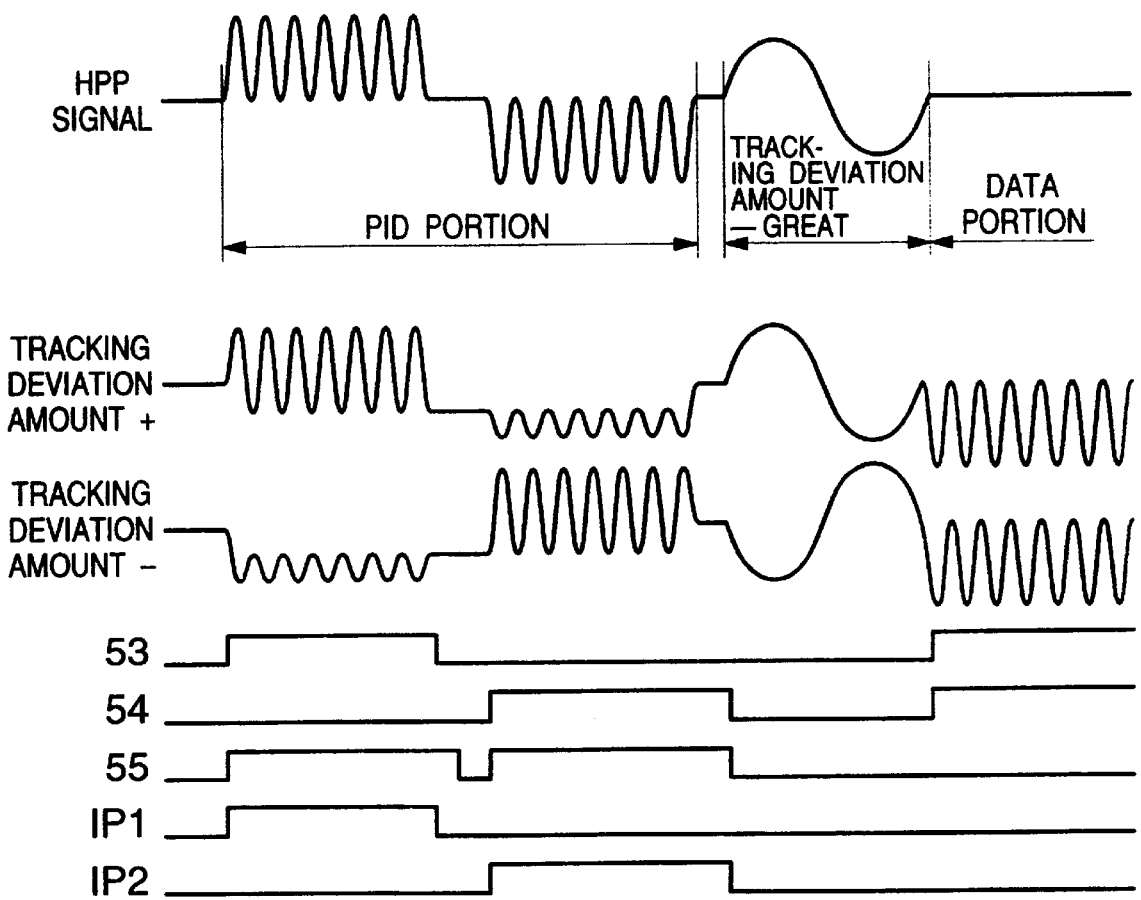
FIG. 8 is a signal waveform diagram of each portion of the example of the PID position detector according to the present invention shown in FIG. 7.

FIG. 7 shows another example of the PID position detector 19 according to the present invention, and FIG. 8 shows the signal waveform at each portion in this example. The HPP signal is the differential signals obtained by receiving the return beam of the beam irradiated to the optical disk by the detector disposed eccentrically with respect to the track center and split into two parts in the track direction. The output signals of these two split detectors, that is, a tracking deviation (+) and tracking deviation (−), are inputted to the signal level detectors 49 and 50 to obtain the signal detection signals 56 and 57, respectively. The signal level detectors 49 and 50 are substantially the same as the level detector 43 described above and attain "1" at the pit portions of the PID portion at which signals having a relatively high frequency component exist and at the data portions at which the recording information exists. Since the tracking deviation (+) and the tracking deviation (−) are the common mode signals having substantially the same amplitude on the data track, the amplitude is extremely small in the HPP signal and the signal level detector 43 attains "0".

Assuming hereby that the logical ORs carried out by the signal level detectors 49, 50 and the signal level detector 43 and IP1 and IP2, respectively, these IP1 and IP2 are the signals which attain "1" at only the pit portions of the PID portion.

Figure 9:
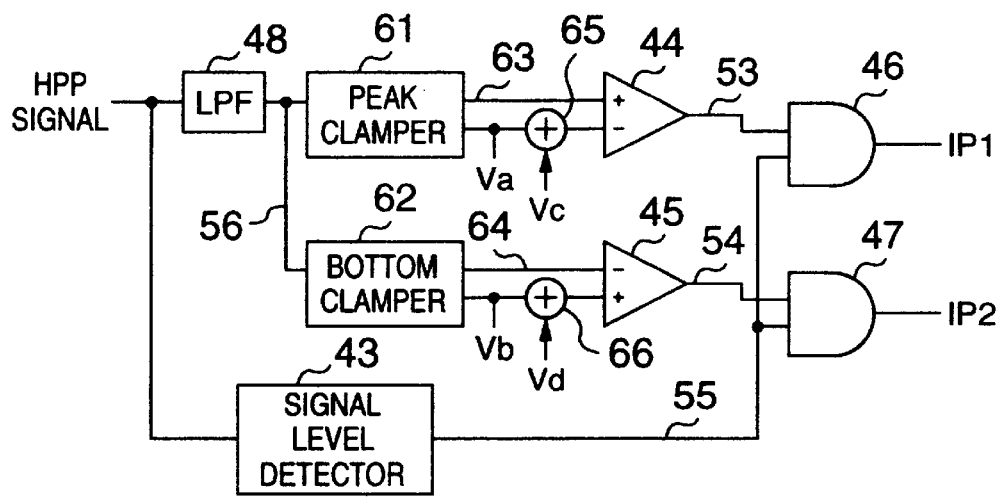
FIG. 9 is a block diagram of still another example of the PID position detector according to the present invention.
Figure 10:
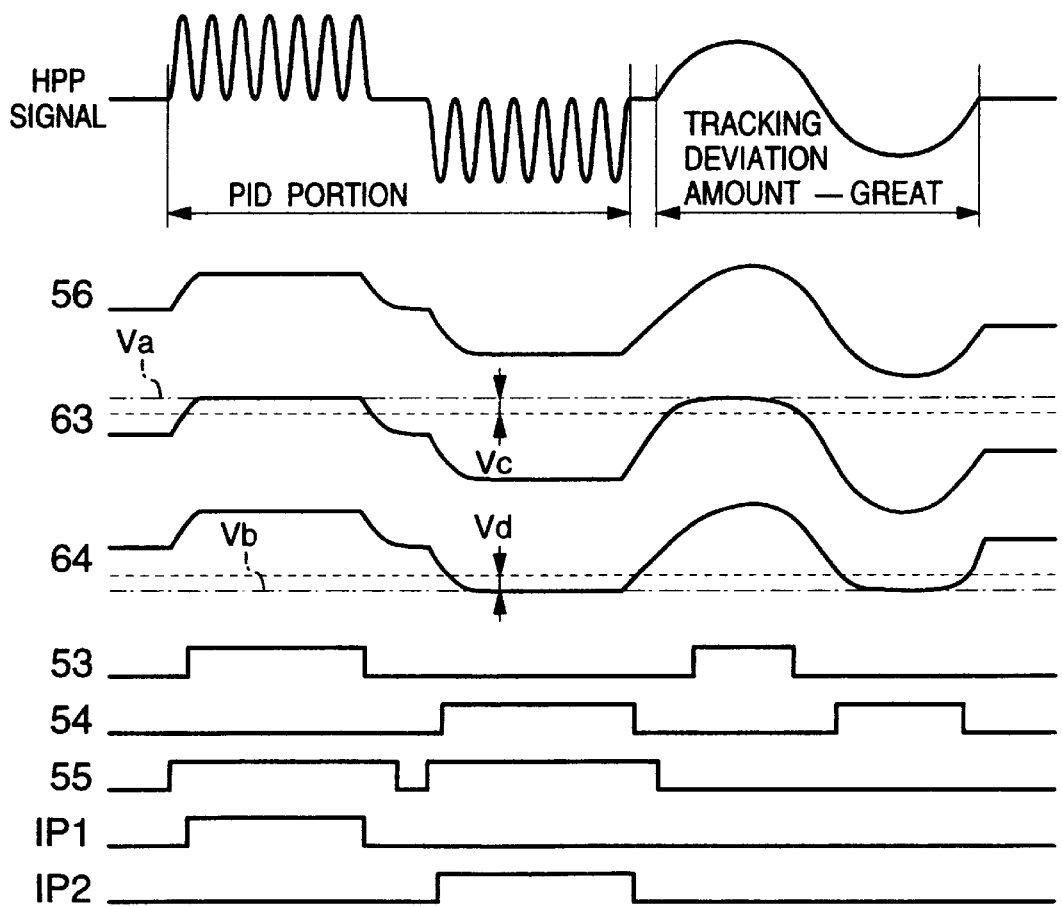
FIG. 10 is a signal waveform diagram of each portion of the example of the PID position detector shown in FIG. 9.

FIG. 9 shows still another example of the PID position detector 19 according to the present invention, and FIG. 10 shows the signal waveform at each portion in this example. The HPP signal is inputted to the low-pass filter (LPF) 48 and a low frequency component signal 56 of the HPP signal is obtained. A peak clamper 61 clamps the upper part of the waveform at a potential Va while a bottom clamper 62 clamps the lower part of the waveform, thereby yielding upper and lower portion clamp waveforms 63 and 64, respectively. These upper and lower portion clamp waveforms 63 and 64 are compared by the comparators 44 and 45 at slice levels obtained by adding addition potentials Vc and Vd to the clamp potentials Va and Vb by adders 65 and 66 to obtain a positive portion detection signal 53 and a negative portion detection signal 54, respectively.

In this case, the positive portion detection signal 53 and the negative portion detection signal 54 occur at the PID portion and attain "1", and at the portions where the tracking deviation amount is great, too, these positive and negative portion detection signals 53 and 54 develop and attain "1". Therefore, assuming that the logical ORs carried out by the signal level detector 43 between the signal detection signal 55, which attains "1" at the pit portion, and the positive and negative portion detection signals 53 and 54, respectively, are IP1 and IP2, these IP1 and IP2 are the signals which attain "1" at only the pit portions of the PID portion.

Incidentally, when the fluctuation of the tracking deviation amount at portions other than the PID portion has a relatively low frequency, the positive portion detection signal 53 and the negative portion detection signal 54 for suppressing the fluctuation by the peak clamper 61 and the bottom clamper 62 do not occur. Therefore, masking by the signal level detection signal 55 need not be effected.

In the examples described above, if the track comprising the groove track and the land track other than the PID portion of the optical disk is so formed as to slightly wobble in the track direction, IP1 and IP2 can be detected at least stably by using the HPP signal having a substantially constant amplitude by the AGC 12 by setting the slice levels V3 and V4 in the following way.

In the optical disks having the wobbles formed thereon, the tracking deviation amount changes due to the wobbles at portions other than the PID portion of the HPP signal. Generally, the tracking deviation amount resulting from the wobbles is sufficiently smaller than the deviation amount due to the pits of the PID portion lest it affects tracking control. Therefore, the slice levels V3 and V4 need be set to the levels which do not respond to the fluctuation of the tracking deviation amount resulting from the wobbles.

The slice levels can be set, for example, by gradually increasing the slice levels V3 and V4 from the center level to both positive and negative, changing the levels until the wobble pattern does not occur in IP1 and IP2 and setting the slice levels V3 and V4 to somewhat higher levels than the levels at which the wobble pattern does not occur, in consideration of the fluctuation of the tracking deviation amount due to the wobbles.

When the optical disk is divided in the recording unit (sector) and the PID portion exists in each sector, each of the control signals 31 to 35 from the drive controller 18 of the present invention is outputted for each of the positive and negative pit portions of each sector and the PID portion, and each signal processing system is controlled.

It is further possible to detect the polarity judgement positions of the land and groove tracks in accordance with the sequence of the occurrence of IP1 and IP2 of the PID position detector by using IP1 and IP2.

Though the explanation has thus been given on the control of the reproduction signal processing system, the timing of the start of recording by the in-recording data portion may be generated from IP1 and IP2.

Figure 11:
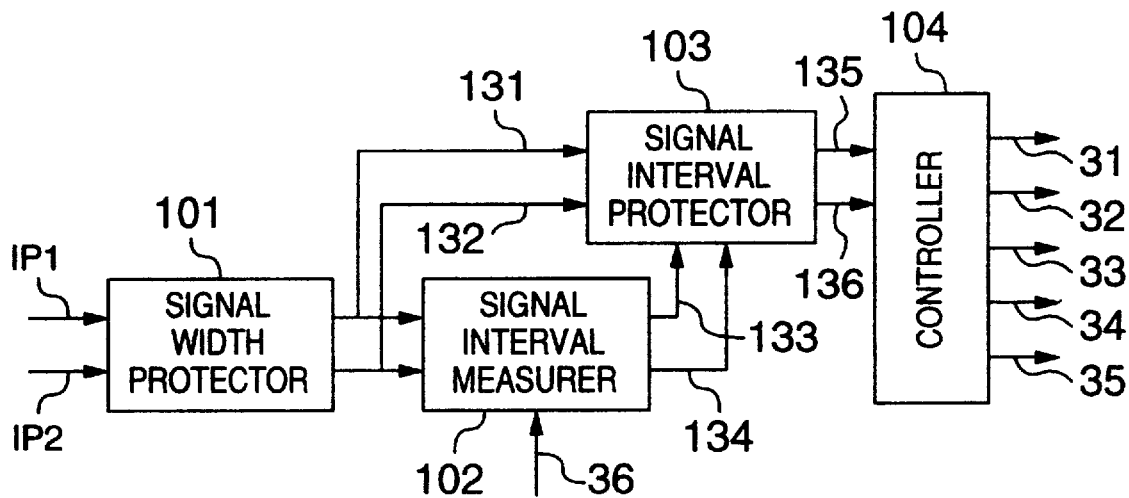
FIG. 11 is a block diagram of an example of a drive controller according to the present invention.

FIG. 11 shows an example of the drive controller 18 shown in FIG. 1. Initially, the circuit construction will be described.

This driving controller comprises a signal width protector 101 which effects sampling by an internal clock by inputting IP1 and IP2, employs an input signal value only when the number of times of continuous detection of "0" or "1" exceeds a predetermined value and holds a previous value at other times, a signal interval measurer 102 which measures the signal interval by using the IP1a and IP2a signals that are inputted, as the input signals, a signal cycle protector 103 which selectively outputs only the IP1a signal 131 and IP2a signal 132, that occur periodically, by using the IP1 detection window signal 133 and the IP2 detection window signal 134 outputted by this signal interval measurer 102, and a controller 104 which inputs the IP1b and IP2b signals 135 and 136, whose cycle is so protected, and generates various control signals 31 to 35.

Next, the operation will be explained.

The IP1 and IP2 signals which are normally inputted from the PID detector 19 are sometimes outputted due to irregular signals (noise, off-tracking, track jump, etc.) and these IP1 and IP2 signals generated in other portions than the IPD portion must be removed. In the PID portion, too, there is the possibility that various drive control signals 31 to 35 are erroneously outputted due to the irregular signals such as the noise.

To cope with the occurrence of the IP1 and IP2 signals due to the irregular signals, protection is effected by dividing the irregular signals into an irregular signal having a short signal width and an irregular signal having a long signal width and in this way, the erroneous output of various drive control signals 31, 32, 33, 34 and 35 due to various irregular signals can be suppressed.

First, as to the irregular signals having a short signal width, the signal width of each of IP1 and IP2 is detected and change detection is not made for the signal change below a predetermined level. This processing is executed by the signal width protector 101.

Next, as to the irregular signals having a long signal width, the occurrence cycle of IP1 and IP2 is measured and IP1 and IP2 occurring outside the cycle are rejected. In this way, the irregular signals of this kind can be suppressed.

More concretely, the signal intervals of the IP1a signal 131 and the IP2a signal 132 outputted from the signal width protector 101 are measured, and the IP1 detection window signal 133 and the IP2 detection window signal 134 are outputted at the point when the signal interval is confirmed. Incidentally, the IP1 detection window signal 133 and the IP2 detection window signal 134 are kept always valid at the point when signal interval is not confirmed.

Incidentally, the signal interval measurer 102 has also the function of outputting the IP1 detection window signal 133 and the IP2 detection window signal 134 from an PID information signal 36 in place of the IP1a signal 131 and the IP2a signal when the PID information signal 36 inputted from the reproduction signal modulator 17 is detected, and can more stably control against the irregular signals by appropriately switching the functions in accordance with the reproduction condition.

The signal interval protector 103 outputs only the IP1a signal 131 generated during the period in which the IP1 detection window signal 133 is varied, as the IP1b signal 135 having the protected signal interval. This also holds true of IP2 and the IP2b signal 136 having the protected signal interval is outputted.

Since the IP1b signal 135 and the IP2b signal 136 are generated from only the IP1 and IP2 signals generated in the PID portion, various drive control signals 31, 32, 33, 34 and 35 can be generated by the controller 104 without being affected by the irregular signals by using these IP1b and IP2b signals as the references.

As described above, even when various irregular signals are contained in IP1 and IP2 inputted from the PID detector 19, various drive control signals 31, 32, 33, 34 and 35 outputted from the drive controller 18 can generate the control signals not affected by the irregular signals.

Figure 15:
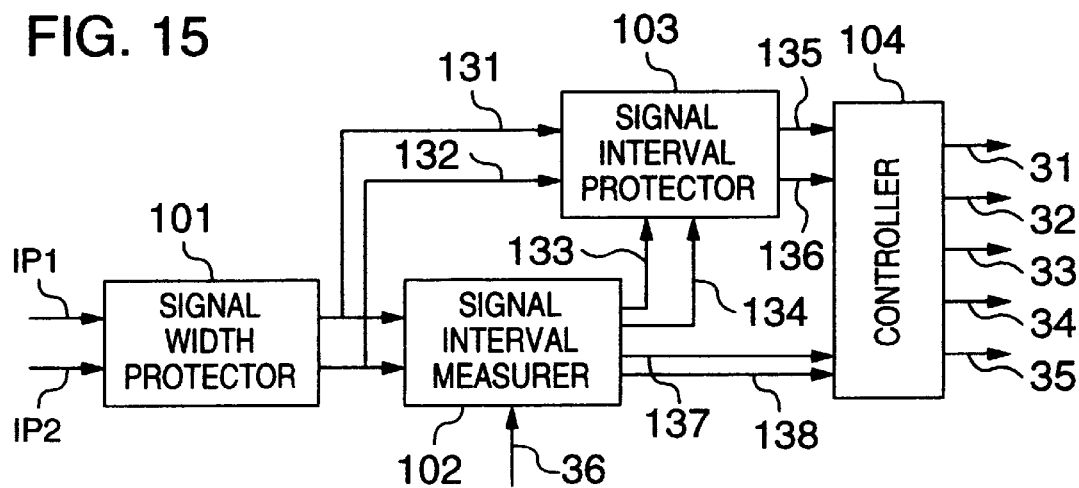
FIG. 15 is a block diagram of another example of the drive controller according to the present invention.

FIG. 15 shows still another example. When the signal interval measurer 102 outputs the IP1 detection window signal 133 and the IP2 detection window signal 134 from the PID information signal 36, the signal interval measurer 102 first generates signals 137 and 138 corresponding to the IP1b signal 135 and the IP2b signal 136, which are then inputted to the controller 104, so that the control signals highly resistant to the irregular signals can be generated by switching the IP1b and IP2b signals 135, 136 and the signals 137, 138 depending on the reproduction condition.

Figure 12:
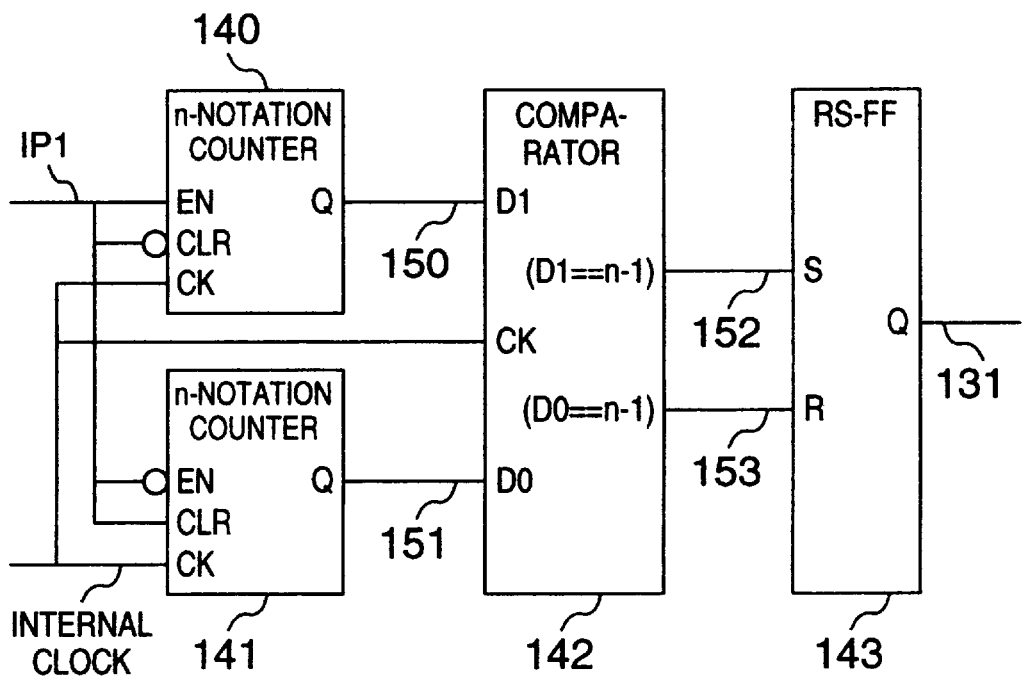
FIG. 12 is a block diagram of an example of a signal width protector according to the present invention.

FIG. 12 shows an example of the signal width protector 101 shown in FIG. 11 that pertains to IP1. Incidentally, the same circuit construction can be employed for IP2, as well.

First, the circuit construction will be explained.

The circuit comprises n-notation counters 140 and 141 which are counted up when an EN input is "1" at the rise of CK and are cleared when a CLR input is "1" at the rise of CK (all the Q outputs are set to "0"), a comparator 142 having a comparison output 152 which outputs "1" only when a D1 input is equal to n−1 at the rise of CK and a comparison output 153 which outputs "1" only when a D0 input is equal to n−1 at the rise of CK, and an RS-FF 143 which sets the Q output (IP1a signal) 131 to "1" when "1" enters its S input, sets its Q output (IP1a signal) 131 to "0" when "1" enters its R input, and latches a previous value at other times.

Next, the circuit operation will be explained.

When IP1 is "1", the n-notation counter 140 is counted up whenever CK rises and at this time, the n-notation counter 141 remains cleared. When counted up to n−1, the n-notation counter 140 returns to 0 and thereafter repeats once again its count-up operation.

When IP1 is "0", the n-notation counter 140 remains cleared, contrary to the above, and the n-notation counter 141 so operates as to repeat its count-up operation.

The comparator sets its comparison output 152 to "1" when the n-notation counter 140 coincides with n−1. Similarly, the comparator sets its comparison output 153 to "1" when the n-notation counter 141 coincides with n−1.

Therefore, when IP1 changes to "1" and "1" continues for a period corresponding to (n−1)×(internal clock), "1" enters the S input of the RS-FF 143 and the IP1a signal 131 changes to "1". Similarly, when IP1 changes to "1", the IP1a signal 131 changes to "0".

Incidentally, when the IP1 again changes to "1" after IP1 changes from "1" to "0" but before the n-notation counter 141 is counted up to n−1, "1" is not outputted from the comparison output 153. In consequence, the IP1a signal remains "1" without changing to "0".

This also holds true of the case when IP1 changes from "0" to "1" and returns to "0" before count-up of n−1, on the contrary.

As a result of the operations described above, the IP1 signal change below n−1 as calculated by the internal clock is not reflected on the IP1a signal and the detection of IP1 for the signal width below a predetermined value can be protected. This also holds true of IP2.

The value n and the frequency of the internal clock may be selected suitably within the range which can sufficiently remove the noise, etc, of IP1 and IP2.

Figure 13:
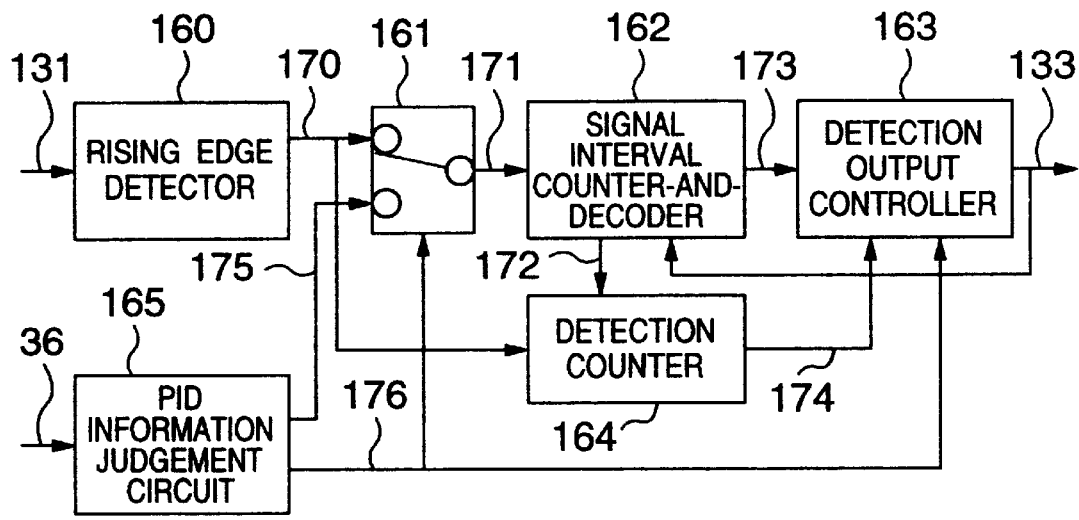
FIG. 13 is a block diagram of an example of a signal cycle measurer according to the present invention.

FIG. 13 shows an example of the signal interval measurer 102 relating to IP1. Incidentally, the same circuit construction can be employed for IP2, too.

First, the circuit construction will be explained.

This circuit comprises a rising edge detector 160 for detecting the rising edge of the IP1a signal 131, a PID information judgement circuit 165 for executing detection judgement of the PID information from the PID information signal 36, a selector 161 for switching and selecting a PID start detection signal A170 outputted from the rising edge detector 160 and a PID start detection signal B175 outputted from a PID information judgement circuit 165, a signal interval counter-and-decoder 162 including a signal interval counter, for clearing the count value when the PID start detection signal C171 outputted from the selector 161 is inputted during the effective period of the PID detection window C133 and keep counting always at other times and a decoder for generating a necessary decoding output signal, a detection counter 164 for executing counting when the PID start detection signal A170 is detected during the effective period of the detection window signal A172 outputted from the signal interval counter-and-decoder 162, and a detection window controller 163 for outputting and controlling the IP1 detection window signal 133 by each input signal 173, 174 and 176.

Next, the circuit operation will be explained.

First, the circuit operation when the PID information signal 19 from the reproduction signal demodulator 17 under the initial state will be explained.

The selector 161 selects the PID start detection signal A170 outputted from the rising edge detector 160 and outputs it as the PID start detection signal C171.

In the signal interval counter-and-decoder 162, on the other hand, the IP1 detection window signal 133 is always effective under the initial state (refer to the following explanation of the operation of the detection window controller 163). When the PID start detection signal C171 becomes effective, the signal interval counter of the signal interval counter-and-decoder 162 is cleared and counting starts in synchronism with the PID start detection signal C171. Next, the count value near the timing at which the PID start detection signal C171 is inputted is decoded and the detection window signal A172 and the detection window signal B173 are outputted.

When the PID start detection signal C171 is inputted to the detection counter 164 while the detection window signal A172 is effective, the detection count value 174 is counted up. However, this count-up operation is stopped when the count value reaches a predetermined count value. When the PID start detection signal C171 is not inputted to the detection counter 164 while the detection window signal A172 is effective, the detection count value 174 is cleared.

When the detection count value 174 exceeds a predetermined value, the detection window controller 163 outputs the detection window signal B173 as the IP1 detection signal 133. Incidentally, when the detection count value 174 is below the predetermined value, the detection window controller 163 outputs the IP1 detection window signal 133 so that it is always effective. Therefore, the IP1 detection window signal 133 is always effective under the initial state.

The operations described above make it possible to check the signal interval by the rising edge detection of IP1 from the initial state and to output the IP1 detection window signal 131 for periodically protecting the IP1 a signal 131 after the signal interval is confirmed. This also holds true of IP2.

FIG. 16(A) is a timing chart from the initial state till the start of the signal interval protection by the IP1 detection window signal 133 and FIG. 16(B) shows the timings during the signal interval protection.

Referring to FIG. 16(B), it can be appreciated that even when any irregular signal occurs in the IP1a signal 131, the irregular signal does not affect the IP1b signal 135.

Next, the circuit operation when the PID information signal from the reproduction signal demodulator 17 becomes effective will be explained.

When the PID information judgement circuit 165 confirms effectiveness of the PID information signal 36, the PID start detection signal B175 is outputted on the basis of the PID information signal and at the same time, the PID information judgement signal 176 becomes effective.

The selector 171 selects the PID start detection signal B175, which is inputted as the PID start detection signal C171 to the signal interval counter-and-decoder 162. As a result, the detection window signal B173 is generated on the basis of the PID information signal. The detection window controller 163 does not employ the detection count value 174 for the judgement when the PID information judgement signal 176 is effective, but outputs always the detection window signal B173 as the PID detection window signal 133.

As described above, the operation can be switched to the generation of the IP1 and IP2 detection windows by using the PID information signal 36 contained in the reproduction signal.

Incidentally, when the PID information judgement signal 176 becomes invalid due to the change of the reproduction state, etc, the operation is returned to the generation of the PID detection window signal 133 by the original PID start detection signal A170.

Figure 14:
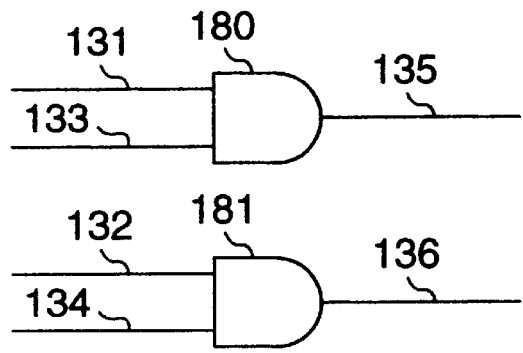
FIG. 14 is a block diagram of an example of a signal cycle protector according to the present invention.

FIG. 14 shows an example of the circuit portion in FIG. 11 relating to the signal cycle protector 103.

The logical ORs 180 and 181 may be carried out between the IP1a signal 131 and IP2a signal 132 outputted from the signal width protector 101 and the IP1 detection window signal 133 and the IP2 detection window 130 outputted from the signal interval measurer 102, respectively.

As described above, the present invention can satisfactorily detect the PID portion even when tracking control is not effected or when tracking control is unstable, and can control the signal processing system by using this detection signal. Therefore, the present invention can accomplish an information recording/reproducing apparatus capable of stably recording and reproducing the information.

What is claimed is:

1. An information recording and reproducing apparatus comprising:
   pre-pit detection means for irradiating a beam onto an information recording medium having land tracks and groove tracks formed alternately in a track on an information recording surface thereof, and having pre-pits pre-formatted in such a manner as to deviate from a center of said track;
   detectors for receiving a reflected beam of said irradiated beam, split into two parts in the track direction to obtain a differential signal;
   pre-pit detection means for detecting pre-pit portions from said differential signal without decoding of pre-pit signals, and generating pre-pit detection signals; and
   means for controlling recording and reproducing processing using said pre-pit detection signals as a reference.

2. An information recording and reproducing apparatus according to claim 1, wherein said pre-pit detection signal is rendered effective or invalid by a first control signal for controlling whether or not a signal pre-formatted on said information recording medium is to be reproduced.

3. An information recording reproducing apparatus according to claim 1, further comprising:
   means for determining a signal level of a reproduction signal of said information recording medium; and
   means for rendering said pre-pit detection signal invalid when the signal level is below a predetermined signal level.

4. An information recording and reproducing apparatus according to claim 1, wherein said pre-pit detection means detects said pre-pit portions by comparing a waveform of said differential signal, from which a high frequency component has been suppressed, with a DC level.

5. An information recording and reproducing apparatus according to claim 1, wherein said pre-pit detection means detects pre-pit portions by comparing a waveform of said differential signal, from which a high frequency component has been suppressed, with positive and negative levels from which a wobble component is not detected, for an information recording medium which comprises a track including groove portions and portions between said groove portions, is divided into recording units and has identification information representing said recording units and pre-formatted for each recording unit, and in which said groove portions and said portions between said groove portions are so formed as to wobble in the track direction.

6. An information recording and reproducing apparatus comprising polarity alternating position detection means for detecting a polarity alternating position at which said land track and said groove track alternate with each other, based on said pre-pit detection signal according to claim 1.

7. An information recording and reproducing apparatus according to claim 1, wherein:
   said control of said recording and reproducing processing is executed for each recording unit when said information recording medium is divided in a recording unit; and
   identification information representing said recording unit is pre-formatted for each said recording unit.

8. An information recording and reproducing apparatus comprising:
   means for irradiating a beam onto an information recording medium having land tracks and groove tracks formed alternately in a track, and pits having information representing at least said land tracks or said groove tracks and so formed as to deviate from the center of said track;
   means for detecting a return beam of said irradiated beam;
   means for processing an information signal based on said return beam by signal processing means to reproducing information and to control recording and reproducing processing by using said pre-pit detection signal according to claim 1 when reproduction of said information by processing of said information signal is not possible.

9. Apparatus for reproducing information recorded in a recording medium having land track portions and groove track portions alternately formed in a track on an information recording surface thereof, and having pre-pits pre-formatted therein and deviating from a center of said track, said apparatus comprising:

means for focusing a detection beam onto said recording surface;

means for detecting a beam reflected from said recording surface and for generating a detection signal indicative thereof;

means for splitting said detection signal into two parts to obtain a differential signal;

means for detecting recorded pre-pit portions by detecting polarity of said differential signal; and means for controlling reproducing processing using signals indicative of detection of said pre-pit portions as a reference.

* * * * *